United States Patent
Lee et al.

(10) Patent No.: US 8,549,631 B2
(45) Date of Patent: Oct. 1, 2013

(54) INTERNET SITE SECURITY SYSTEM AND METHOD THERETO

(75) Inventors: Ho-Woong Lee, Gyeonggi-do (KR); Sung Jin Yang, Seoul (KR); Sang Min Chung, Gyeonggi-do (KR)

(73) Assignee: Ahnlab, Inc., Seoul (KR)

( * ) Notice: Subject to any disclaimer, the term of this patent is extended or adjusted under 35 U.S.C. 154(b) by 203 days.

(21) Appl. No.: 13/054,816

(22) PCT Filed: Feb. 12, 2009

(86) PCT No.: PCT/KR2009/000671
§ 371 (c)(1), (2), (4) Date: Feb. 3, 2011

(87) PCT Pub. No.: WO2010/093071
PCT Pub. Date: Aug. 19, 2010

(65) Prior Publication Data
US 2011/0126285 A1    May 26, 2011

(51) Int. Cl.
- G06F 11/00 (2006.01)
- G06F 12/14 (2006.01)
- G06F 12/16 (2006.01)
- G08B 23/00 (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 7,873,635 B2* | 1/2011 | Wang et al. | 707/735 |
| 8,225,392 B2* | 7/2012 | Dubrovsky et al. | 726/22 |
| 8,239,939 B2* | 8/2012 | Dunagan et al. | 726/22 |

FOREIGN PATENT DOCUMENTS

| | | |
|---|---|---|
| KR | 10-2000-0054538 | 9/2000 |
| KR | 10-2005-0035267 | 4/2005 |
| KR | 10-2006-0059759 | 6/2006 |
| KR | 10-2007-0048079 | 5/2007 |
| KR | 10-2009-0081200 | 7/2009 |
| WO | WO 99/45454 | 9/1999 |

* cited by examiner

*Primary Examiner* — Kambiz Zand
*Assistant Examiner* — Stephen Sanders
(74) *Attorney, Agent, or Firm* — Preti Flaherty Beliveau & Pachios LLP

(57) ABSTRACT

The present invention discloses an internet site security system and method thereof. That is, the present invention comprises a browser execution module which executes the browser for providing a work-performing environment on the internet site according to the selection of a user; a memory protection module which, according to the execution of the browser, prevents an external module from accessing a memory area allocated to the browser and detects whether the memory area is tampered or not and whether the executing code is tampered or not; and a browser protection module which prevents another process or module from debugging the browser execution module according to the execution of the browser, and distinguishing several modules loaded to the memory area into acceptable modules and unacceptable modules, and thereby is able to provide a secure electronic transaction based environment against a malicious attack.

25 Claims, 3 Drawing Sheets

INTERNET SITE SECURITY SYSTEM AND METHOD THERETO

BACKGROUND OF THE INVENTION

1. Field of the Invention

The present invention relates to security of a web-based electronic transaction site, and more specifically to, in operating an internet-based electronic transaction program, an internet site security system for blocking malicious access of a hacker and preventing special data and a processing method of the corresponding electronic transaction site from being transformed and a method thereof.

2. Description of the Related Art

Generally, a tampering act of an executing image code on a memory is done by carrying out a hooking act many times, and, in some hacking tools, is caused by tampering special code arbitrarily in order to produce a different action which is unlike the original action of the executing image.

Such an act of tampering causes many security problems by precluding an action to be carried out in effect. For example, a malicious program forms a Rootkit that prevents itself from being found by the hooking and the data tampering of the special executing image, and thereby it hides itself and makes a processing method to be changed or causes a wrong operation by continuously trying to attack the normal executing image. Also, it may be used in a reversing process such as a crack etc. which enables a user without permission to access use of the electronic transaction program without an authentication procedure by a correcting code part related with authentication.

In relation to this, existing programs used in web-based electronic transaction systems have many security problems due to generality in the internet environment and its intrinsic weakness.

To compensate for these weaknesses in security, various security products are used together such as a keyboard security product for protecting contents for a user to input through the keyboard, PKI security products for protecting exchanged data on the internet, a digital certificate for identification and confirmation of data integrity in an electronic transaction, and firewall.

However, the abovementioned security systems provide security only regarding parts related to data transfer, but cannot defend against acts directly accessing and tampering a memory of an electronic transaction program in which data are trimmed, produced and processed, or acts accessing or tampering web page source code. Thereby, it is anticipated that hackers continuously attack programs themselves processing the electronic transaction based on the internet. Thus, defense against hackers' malicious access and attacks such as transformation of data and processing methods on the special programs which are executed based on the internet are needed.

SUMMARY OF THE INVENTION

1. Object of the Invention

To solve the abovementioned problems of the prior art, the present invention is provided. A technical purpose of the present invention is to provide an internet site security system and a method thereof that, in executing the electronic transaction program based on the internet, block a hacker's malicious access and prevent an executing file of the electronic transaction program or special data and a processing method on the memory thereof from being transformed.

2. Disclosure of the Invention

According to an aspect of the present invention, in order to achieve the abovementioned technical purpose, an internet site security system is provided. The system is characterized in comprising:

a browser execution module which executes a browser for providing a work-performing environment on the internet site according to the selection of a user; a memory protection module which, according to the execution of the browser, prevents an external module from accessing memory area allocated to the browser, and detects whether the memory area is tampered or not and whether the executing code is tampered or not; and a browser protection module which prevents another process or module from debugging the browser execution module according to the execution of the browser, and distinguishes several modules loaded to the memory area into acceptable modules and unacceptable modules.

Preferably, the browser execution module is characterized in executing the browser according to the selection of the user in the user's connection status to the internet site.

Preferably, the browser execution module is characterized in executing the browser according to the selection of the user before the user's connection to the internet site.

Preferably, the memory protection module is characterized in preventing another process or module from accessing a memory area allocated to the browser by applying API Hooking technology on User Level and Kernel Level.

Preferably, the memory protection module is characterized in, according to a predetermined setup cycle, preventing another process or module from accessing a memory area allocated to the browser by monitoring pre-attack including access to the memory area allocated to the browser in process level.

Preferably, the memory protection module is characterized in, according to a predetermined setup cycle, detecting whether the several modules are tampered or not by carrying out verification of file validation of the several modules loaded to the memory area allocated to the browser using an error verification algorithm.

Preferably, the memory protection module is characterized in detecting whether the codes of the several modules loaded to the memory area are tampered or not according to execution of the browser based on the original checkable data and the authentication and integrity checkable data.

Preferably, the memory protection module is characterized in detecting whether the codes of the several modules are tampered or not by comparing the code information of the several modules loaded to the memory area according to the execution of the browser with the original codes based on the original checkable data and the authentication and integrity checkable data which include CRC, signed information and hash values of the several modules loaded to the memory area.

Preferably, the browser protection module is characterized in selecting in real time an acceptable module of the several modules loaded to the memory area on the basis of a White List which already stores a list of acceptable modules of the several modules loaded according to the execution of the browser, and in case of, in the memory area, being a special module not to be included in the White List, notifying it to a user.

Preferably, the browser protection module is characterized in checking whether the special module is included in a list of unacceptable modules or not on the basis of a Black List which already stores the list of unacceptable modules of the several modules loaded according to the execution of the browser, and notifying it to the user.

Preferably, the browser protection module is characterized in checking whether a special module is included in a list of unacceptable modules or not on the basis of a Black List which already stores the list of unacceptable modules of the several modules loaded according to the execution of the browser, and blocking the module.

Preferably, the browser protection module is characterized in making debugging from another process or module to the browser execution module difficult by inserting a predetermined code into the browser, wherein the predetermined code prevents a data processing method of the browser from being analyzed.

Preferably, the browser protection module is characterized in preventing another process or module from debugging for analyzing a data processing method of the browser by carrying out a virtualization process for the predetermined code executed in the inside of the browser.

Preferably, the browser protection module is characterized in preventing Reverse Engineering against the browser execution module in executing the browser by carrying out a code virtualization and packing work for the browser execution module.

According to another aspect of the present invention, an internet site security method is provided. The method is characterized in consisting of steps of:

a) executing a browser for providing a work-performing environment on the internet site according to the selection of a user;

b) preventing another process or module from accessing a memory area allocated to the browser, according to the execution of the browser;

c) simultaneously with step b), checking whether several modules loaded to the memory area are tampered or not according to performance of a special operation on the internet site; and d) simultaneously with step c), preventing another process or module from debugging the browser execution module and distinguishing in real time several modules being loaded to the memory area into acceptable modules and unacceptable modules.

Preferably, step a) is characterized in executing the browser according to the selection of the user in the user's connection status to the internet site.

Preferably, step a) is characterized in executing the browser according to the selection of the user before the user's connection to the internet site.

Preferably, step b) is characterized in preventing another process or module from accessing a memory area allocated to the browser by applying API Hooking technology on User Level and Kernel Level.

Preferably, step b) is characterized in, according to a predetermined setup cycle, preventing another process or module from accessing a memory area allocated to the browser by monitoring pre-attack including access to the memory area allocated to the browser in process level.

Preferably, step c) is characterized in, according to a predetermined setup cycle, detecting whether the several modules are tampered or not by carrying out verification of file validation of the several modules loaded to the memory area allocated to the browser using an error verification algorithm.

Preferably, step c) is characterized in detecting whether the codes of the several modules loaded to the memory area are tampered or not according to execution of the browser based on the original checkable data and the authentication and integrity checkable data.

Preferably, step c) is characterized in detecting whether the codes of the several modules are tampered or not by comparing the code information of the several modules loaded to the memory area according to the execution of the browser with the original codes based on the original checkable data and the authentication and integrity checkable data which include CRC, signed information and hash values of the several modules loaded to the memory area.

Preferably, step d) is characterized in preventing the browser execution module from being debugged by another process or module by inserting predetermined code into the browser, wherein the predetermined code prevents a data processing method of the browser from being analyzed.

Preferably, step d) is characterized in preventing another process or module from debugging for analyzing a data processing method of the browser by carrying out a virtualization process for the predetermined code being executed in the inside of the browser.

Preferably, step d) is characterized in consisting of steps:

d-1) selecting in real time an acceptable module of the several modules loaded to the memory area on the basis of a White List which already stores a list of acceptable modules of the several modules loaded according to the execution of the browser;

d-2) in case of, in the memory area, being a special module not to be included in the White List, notifying it to a user;

d-3) checking whether a special module being not included in the White List is included in a list of unacceptable modules or not on the basis of a Black List which already stores the list of unacceptable modules of the several modules loaded according to the execution of the browser;

d-4) in case that the special module is included in the list of unacceptable modules, notifying it to the user and terminating the browser.

Preferably, step d) is characterized in further comprising:

d-5) in case that a special module included in the unacceptable modules is loaded in real time, blocking the special module being loaded in real time.

3. Effects of the Invention

The internet site security system and method thereof according to the present invention are able to provide a secure electronic transaction based environment against a malicious attack based on providing reliability on action of the process by checking the list of doing management of the list allowed to load to its process or the list to be blocked.

Also, the internet site security system and method thereof according to the present invention are able to provide a secure electronic transaction based environment against a factitious script tampering and an attack from the outside by not providing an interface for the script which is provided generally in an electronic transaction system but blocking it.

BRIEF DESCRIPTION OF THE DRAWINGS

The following drawings accompanied with the present specification illustrate preferable embodiments of the present invention, and are just to make the technical idea of the present invention understood easily with the following description of specific embodiments. Thus, the scope of the invention should not be defined only by the drawings.

DETAILED DESCRIPTION OF PREFERRED EMBODIMENTS

Now, various embodiments of the present invention will be specifically described with reference to the accompanying drawings.

Figure 1:
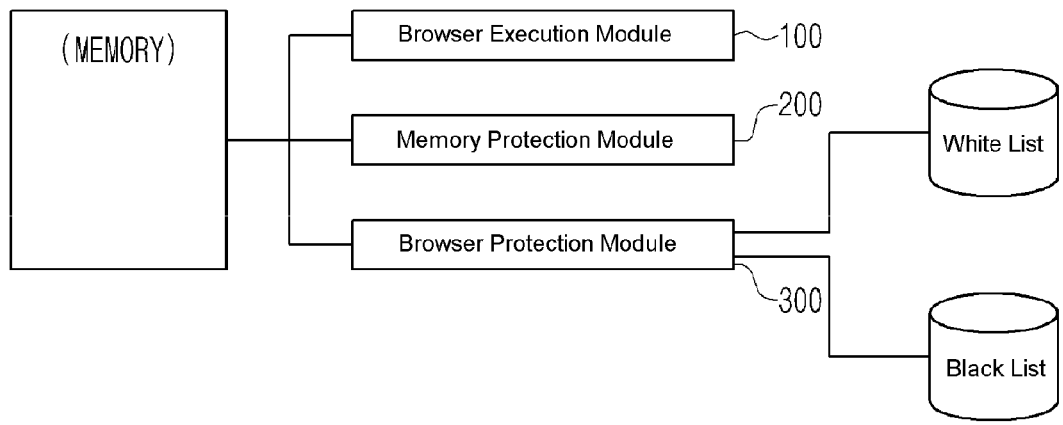
FIG. 1 shows a general structure of the internet site security system according to an embodiment of the present invention.

FIG. 1 shows a general structure of the internet site security system according to an embodiment of the present invention.

As shown at FIG. 1, the system comprises: a browser execution module (100) providing a browser for web-based electronic transaction; a memory protection module (200) for protecting a memory area allocated to the Browser; and a browser protection module (300) protecting the browser execution module (100) and selecting an acceptable module loaded according to the execution of the browser.

The browser execution module (100) executes the browser providing a work-performing environment on the internet site for the electronic transaction according to the selection of a user. At this time, the browser execution module (100) executes the browser according to the selection of the user in the user's connection status to the internet site, or executes the browser according to user's selection after the user's connection to the internet site.

The memory protection module (200) prevents another process or module from accessing the memory area allocated to the browser, according to the execution of the browser by the browser execution module (100). More specifically, the memory protection module (200) prevents another process or module from accessing the memory area allocated to the browser, by applying API hooking technology on the User Level and Kernel Level. Also, the memory protection module (200) is able to prevent an external module from accessing by monitoring whether the external module does the pre-attack or not that includes Open Process hooking and Service Table Entry modification to the memory area allocated to the browser according to a predetermined cycle.

Also, the memory protection module (200) detects whether several modules loaded to the memory area according to special work performance of a user on the internet site are tampered or not and whether execution codes loaded to the memory area are tampered or not. More specifically, the memory protection module (200) detects whether several modules loaded to the memory area are tampered or not by carrying out verification of file effectiveness of several modules loaded to the memory area allocated to the browser using an error check algorithm. Also, the memory protection module (200) detects whether the codes of the several modules loaded to the memory area are tampered or not according to the execution of the browser based on information of the original checkable data and the authentication and integrity checkable data. For example, it can be detected whether the codes of the several modules loaded to the memory area are tampered or not by comparing the code information of the several modules being loaded to the memory area according to the execution of the browser with the original code based on the original checkable data and the authentication and integrity checkable data which include CRC, signed information and hash values of the several modules loaded to the memory area.

The browser protection module (300) prevents another process or module from trying to debug the browser execution module (100) in executing the browser by a debugging prevention function. For example, by adding a predetermined code which prevents debugging into the browser or makes it difficult, the browser protection module (300) makes it difficult to analyze the data processing method of the browser by debugging during or before proceeding with the electronic transaction through the browser. Also, by performing virtualization of all or some codes which are carried out in the browser, the browser protection module (300) inhibits verification of the original code of an important browser in debugging so that it can prevent the data processing method from being analyzed.

Also, the browser protection module (300) prevents Reverse Engineering against the browser execution module (100) in executing the browser by carrying out a code virtualization and a packing work about the browser execution module (100).

Also, the browser protection module (300) selects in real time an acceptable module and an unacceptable module among modules loaded during the execution of the browser. More specifically, the browser protection module (300) comprises a White List which already stores a list of acceptable modules among the several modules loaded in real time according to the execution of the browser, and compares the White list with the module loaded to the memory area, thereby selecting in real time an acceptable module. At this time, the browser protection module (300), in case of being a special module not to be included in the White List in the memory area, notifies it to a user, and thereby informs that a module besides the acceptable module exists. Also, the browser protection module (300), together with the White list, further comprises a Black List which already stores the list of unacceptable modules among the several modules loaded according to the execution of the browser. On the basis of this, the browser protection module (300) compares the Black list with a module besides the selected unacceptable module, thereby checks whether the module corresponds to the unacceptable module, and in case the module is included in the list of unacceptable modules, notifies it to the user and also terminates the executing of the browser. Also, in case that the special module loaded in real time to the memory area corresponds to the unacceptable list, the browser protection module (300) blocks it.

Also, the browser protection module (300) further comprises a web page tampering prevention function, thereby preventing another process or module from tampering the web page in user's connecting.

Figure 2:
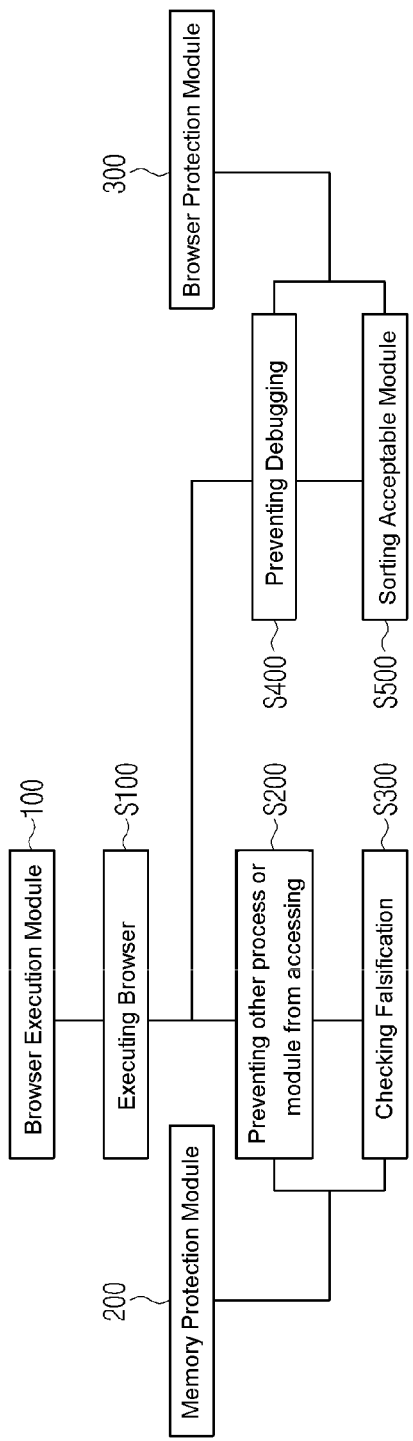
FIGS. 2 and 3 show general flow charts for explaining the internet site security method according to an embodiment of the present invention.

In the following, with reference to FIG. 2, an internet site security method according to the present invention is explained. Here, FIG. 2 shows a general flow chart for explaining the internet site security method according to an embodiment of the present invention.

First, according to user's selection, the browser for providing a work performance environment on the internet site is executed (S100). Preferably, the browser execution module (100) executes the browser providing a work performance environment on the internet site for an electronic transaction according to the user's selection. At this time, the browser execution module (100) executes the browser according to the user's selection in the user's connection to the internet site, or executes the browser according to the user's selection after the user's connection to the internet site. Here, in case the user does not select the execution of the browser, it is preferable that the work performance environment on the internet site is provided using the existing general browser.

And then, according to the execution of the browser, access from another process or module to the memory area allocated to the browser is prevented (S200). Preferably, the memory protection module (200) prevents another process or module from accessing the memory area allocated to the browser according to the execution of the browser through the browser execution module (100). More specifically, the memory protection module (200) applies API hooking technology on User Level and Kernel Level, and thereby prevents another process or module from accessing the memory area allocated to the browser. Also, the memory protection module (200) is able to prevent an external module from accessing by monitoring whether the external module does the pre-attack or not that includes Open Process hooking and Service Table Entry modification to the memory area allocated to the browser according to a predetermined cycle.

Also, whether several modules loaded to the memory area according to an execution of a special operation on the internet site are tampered or not is checked (S300). Preferably, the memory protection module (200) checks whether several modules loaded to the memory area according to the user's execution of the special work in the internet site. More specifically, the memory protection module (200), according to a predetermined cycle, carries out verification of file effectiveness of the several modules loaded to the memory area allocated to the browser using error verification algorithm, thereby detecting whether the several modules loaded to the memory area are tampered or not. Also, the memory protection module (200) detects whether the codes of the several modules loaded to the memory area are tampered or not according to execution of the browser based on the original checkable data and the authentication and integrity checkable data. For example, by comparing the code information of the several modules loaded to the memory area according to the execution of the browser with the original codes based on the original checkable data and the authentication and integrity checkable data which include CRC, signed information and hash values of the several modules loaded to the memory area, whether the codes of the several modules loaded to the memory area are tampered or not is detected.

With this, according to the execution of the browser, debugging from another process or module to the browser execution module (100) is prevented (S400). Preferably, the browser protection module (300) prevents another process or module from trying to debug the browser execution module (100) using a debugging protection function in execution of the browser. For example, the browser protection module (300) makes it difficult for the data processing method of the browser to be analyzed through the debugging during or before the execution of the browser, by inserting predetermined code which prevents or makes the debugging difficult into the browser. Also, the browser protection module (300) carries out a virtualization process for all codes or some important codes executed in the inside of the browser, thereby making it hard for the original code of an important browser to be verified in debugging, and may prevent a data processing method of the browser from being analyzed.

Figure 3:
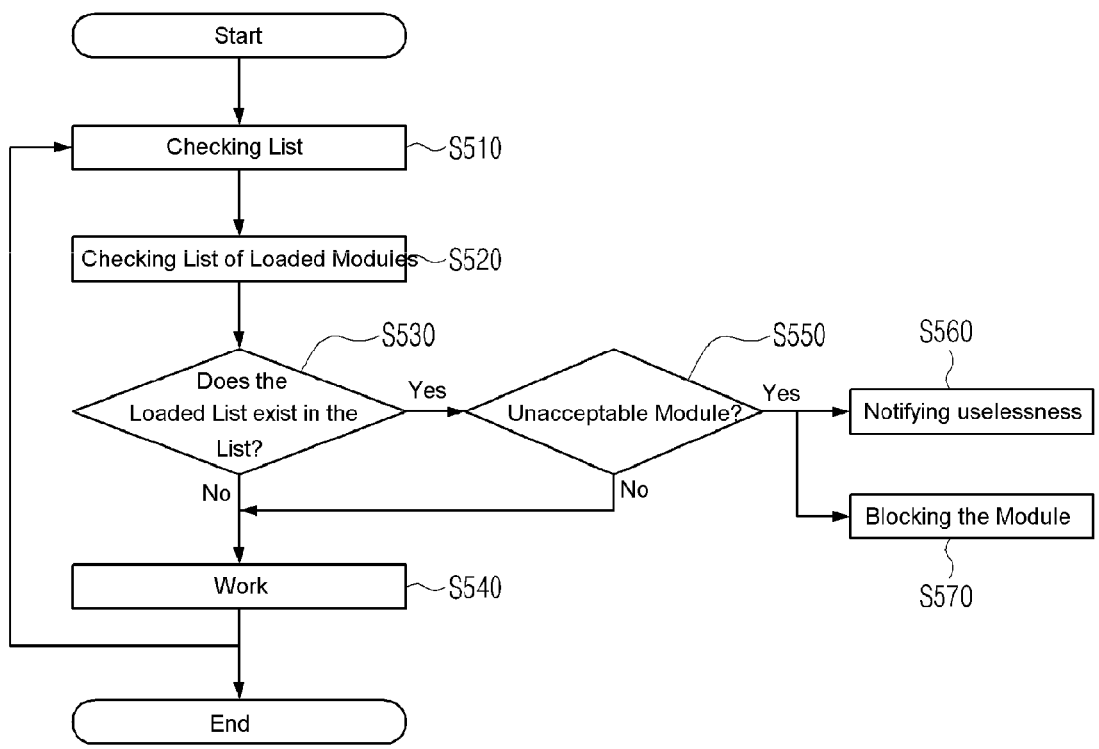

Also, according to the execution of the browser, an acceptable module and an unacceptable module among several modules loaded to the memory area are selected in real time (S500). Preferably, the browser protection module (300) checks a module loaded during the execution of the browser, and thereby distinguishes in real time the several modules loaded to the memory area into acceptable modules and unacceptable modules. In other words, as shown in FIG. 3, the browser protection module (300) selects in real time an acceptable module, on the basis of a White List which already stores a list of acceptable modules of the several modules loaded in real time according to the execution of the browser, by comparing the White list with several modules loaded to the memory area (S510-S530). At this time, in case all modules loaded in real time are acceptable module, the execution of the browser continues (S540), but in case there is a special module not included in the White List, browser protection module (300) notifies it to the user, thereby informing that a module besides the acceptable modules exists among the modules loaded to the memory area.

Also, the browser protection module (300), on the basis of a Black List which already stores the list of unacceptable modules among the several modules loaded according to the execution of the browser, compares the Black List with the module, thereby checking whether the module is included in a list of unacceptable modules or not (S550). At this time, in case a module besides the acceptable modules is included in the list of the unacceptable module, the browser protection module notifies this to the user and terminates the executing of the browser, and also blocks the loading of the corresponding module to the memory area (S560-S570).

Various embodiments of the present invention have been specifically described with reference to the accompanying drawings. However, the present invention is not limited by the abovementioned embodiments. Without avoiding obscuring essentials of the invention claimed in the following claims, thus, the technical scope of the present invention reaches to the extent to which one skilled in the relevant art can make other equivalents or alternatives of the embodiments.

The internet site security system and method thereof according to the present invention has industrial applicability because, while overcoming the existing technical limits, it uses not only relevant technology but also has a possibility of commercial applicability, and may be clearly implemented practically because it overcomes the disadvantage that security is vulnerable due to openness and weakness of a program in the existing web environment and provides a secure electronic transaction system.

The invention claimed is:

1. An internet site security system comprising:
a browser execution module which executes a browser for providing a work-performing environment on the internet site according to the selection of a user;
a memory protection module which, according to the execution of the browser, prevents an external module from accessing a memory area allocated to the browser, and detects whether the allocated memory area is tampered or not and whether the executing code is tampered or not; and
a browser protection module which prevents another process or module from debugging the browser execution module according to the execution of the browser, and distinguishes modules loaded into the memory area into acceptable modules and unacceptable modules,
wherein the browser protection module identifies, in real time, an acceptable module among the several modules loaded into the memory area on the basis of a White List of acceptable modules of the several modules loaded according to the execution of the browser and notifies the user if a first module not in the White List is in the memory area.

2. The internet site security system according to claim 1, characterized in that the browser execution module executes the browser according to the user's selection in the user's connection status to the internet site.

3. The internet site security system according to claim 1, characterized in that the browser execution module executes the browser according to the user's selection before the user's connection to the internet site.

4. The internet site security system according to claim 1, characterized in that the memory protection module prevents another process or module from accessing the memory area allocated to the browser by applying API Hooking technology on User Level and Kernel Level.

5. The internet site security system according to claim 1, characterized in that the memory protection module, according to a predetermined setup cycle, prevents another process or module from accessing the memory area allocated to the browser by monitoring pre-attack including accessing the memory area allocated to the browser in process level.

6. The internet site security system according to claim 1, characterized in that the memory protection module, according to a predetermined setup cycle, detects whether the several modules are tampered or not by carrying out verification of file validation of the several modules loaded into the memory area allocated to the browser using an error verification algorithm.

7. The internet site security system according to claim 1, characterized in that the memory protection module detects whether codes of the several modules loaded into the memory area are tampered or not according to execution of the browser based on original checkable data and authentication and integrity checkable data.

8. The internet site security system according to claim 7, characterized in that the memory protection module detects whether the codes of the several modules are tampered or not by comparing code information of the several modules loaded into the memory area according to the execution of the browser with original codes based on the original checkable data and the authentication and integrity checkable data which include CRC, signed information and hash values of the several modules loaded into the memory area.

9. The internet site security system according to claim 1, characterized in that the browser protection module checks whether the first module is included in a Black List of unacceptable modules among the several modules loaded according to the execution of the browser, and notifies the user if the first module is in the Black List and is in the memory area.

10. The internet site security system according to claim 1, characterized in that the browser protection module checks whether the first module is included in a Black List of unacceptable modules among the several modules loaded in real time according to the execution of the browser, and blocks the corresponding first module if the first module is in the Black List.

11. The internet site security system according to claim 1, characterized in that the browser protection module makes it difficult for another process or module to carry out debugging of the browser execution module by inserting predetermined code into the browser, wherein the predetermined code prevents a data processing method of the browser from being analyzed.

12. The internet site security system according to claim 1, characterized in that the browser protection module prevents another process or module from debugging for analyzing a data processing method of the browser by carrying out a virtualization process for predetermined code executed in the inside of the browser.

13. The internet site security system according to claim 1, characterized in that the browser protection module prevents Reverse Engineering against the browser execution module in executing the browser by carrying out a code virtualization and a packing work about the browser execution module.

14. An internet site security method, comprising steps of:

a) executing a browser for providing a work-performing environment on the internet site according to the selection of a user;
b) preventing another process or module from accessing a memory area allocated to the browser, according to the execution of the browser;
c) simultaneously with step b), checking whether modules loaded into the allocated memory area are tampered or not according to performance of a special operation on the internet site; and
d) simultaneously with step c), preventing another process or module from debugging the browser execution module and distinguishing, in real time, modules being loaded into the memory area into acceptable modules and unacceptable modules, wherein step d) comprises:
d-1) identifying, in real time, an acceptable module of the modules loaded into the memory area on the basis of a White List of acceptable modules among the modules loaded according to the execution of the browser;
d-2) notifying the user if there is a first module not included in the White List loaded in the memory area;
d-3) checking whether the first module not in the White List is in a Black list of unacceptable modules among the several modules loaded according to the execution of the browser; and
d-4) notifying the user if the first module is in the Black list of unacceptable modules and terminating the browser.

15. The internet site security method according to claim 14, characterized in that step a) executes the browser according to the selection of the user in the user's connection status to the internet site.

16. The internet site security method according to claim 14, characterized in that step a) executes the browser according to the selection of the user before the user's connection to the internet site.

17. The internet site security method according to claim 14, characterized in that step b) prevents another process or module from accessing a memory area allocated to the browser by applying API Hooking technology on User Level and Kernel Level.

18. The internet site security method according to claim 14, characterized in that step b), according to a predetermined setup cycle, prevents another process or module from accessing the memory area allocated to the browser by monitoring pre-attack including accessing the memory area allocated to the browser in process level.

19. The internet site security method according to claim 14, characterized in that step c), according to a predetermined setup cycle, detects whether the several modules are tampered or not by carrying out verification of file validation of the several modules loaded into the memory area allocated to the browser using an error verification algorithm.

20. The internet site security method according to claim 14, characterized in that step c) detects whether codes of the several modules loaded into the allocated memory area are tampered or not according to execution of the browser based on original checkable data and authentication and integrity checkable data.

21. The internet site security method according to claim 20, characterized in that step c) detects whether codes of the several modules are tampered or not by comparing code information of the several modules loaded into the allocated memory area according to the execution of the browser with original codes based on original checkable data and authentication and integrity checkable data which include CRC, signed information and hash values of the several modules loaded into the allocated memory area.

22. The internet site security method according to claim 14, characterized in that step d) prevents another process or module from debugging the browser execution module by inserting predetermined code into the browser, wherein the predetermined code prevents a data processing method of the browser from being analyzed.

23. The internet site security method according to claim 14, characterized in that step d) prevents another process or module from debugging for analyzing a data processing method of the browser by carrying out a virtualization process of the predetermined code being executed in the browser.

24. The internet site security method according to claim 14, characterized in that step d) further comprises:

d-5) in case the first module included in the unacceptable module is loaded in real time, blocking the first module being loaded in real time.

25. A computer-readable physical recording medium comprising instructions thereon that, when executed by a computer, cause the computer to execute an internet site security method comprising:

i) executing a browser for providing a work-performing environment on the internet site according to the selection of a user;

ii) preventing another process or module from accessing a memory area allocated to the browser, according to the execution of the browser;

iii) simultaneously with step ii), checking whether modules loaded into the allocated memory area are tampered or not according to performance of a special operation on the internet site; and iv) simultaneously with step iii), preventing another process or module from debugging the browser execution module and distinguishing, in real time, modules being loaded into the memory area into acceptable modules and unacceptable modules, wherein step iv) comprises:

iv-1) identifying, in real time, an acceptable module of the modules loaded into the memory area on the basis of a White List of acceptable modules among the modules loaded according to the execution of the browser;

iv-2) notifying the user if there is a first module not included in the White List loaded in the memory area;

iv-3) checking whether the first module not in the White List is in a Black list of unacceptable modules among the several modules loaded according to the execution of the browser; and iv-4) notifying the user if the first module is in the Black list of unacceptable modules and terminating the browser.

\* \* \* \* \*